(12) United States Patent
Juen

(10) Patent No.: US 6,727,943 B1
(45) Date of Patent: Apr. 27, 2004

(54) ELECTRONIC CAMERA WITH WHITE BALANCE ADJUSTMENT RECORDING MEDIUM STORING IMAGE PROCESSING PROGRAM FOR WHITE BALANCE ADJUSTMENT

(75) Inventor: Masahiro Juen, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/487,580

(22) Filed: Jan. 19, 2000

(30) Foreign Application Priority Data

Jan. 20, 1999 (JP) .......................................... 11-011509

(51) Int. Cl.[7] ................................................ H04N 9/73
(52) U.S. Cl. .................................... 348/223.1; 348/345
(58) Field of Search .............................. 348/228.1, 350, 348/345, 227.1, 223.1

(56) References Cited

U.S. PATENT DOCUMENTS

| | | | | | |
|---|---|---|---|---|---|
| 5,485,202 A | * | 1/1996 | Ueda | ....................... | 348/223.1 |
| 5,644,358 A | * | 7/1997 | Miyano et al. | .......... | 348/223.1 |
| 5,926,218 A | * | 7/1999 | Smith | ......................... | 348/335 |
| 6,545,710 B1 | * | 4/2003 | Kubo et al. | .............. | 348/223.1 |

* cited by examiner

Primary Examiner—Wendy R. Garber
Assistant Examiner—Matthew L Rosendale
(74) Attorney, Agent, or Firm—Oliff & Berridge, PLC

(57) ABSTRACT

A photographic image-capturing element that receives a subject light flux and outputs a photographic image signal and a white balance adjustment image-capturing element that receives the subject light flux and outputs a white balance adjustment image signal are provided. Based upon the white balance adjustment image signal, color data are extracted from at least partial area in the photographic image plane to calculate the distance between the color data and a full radiator locus, i.e., the offset quantity by which the color data are offset from light source reference color data. The color of the light source is estimated by evaluating the offset quantity thus calculated, an R gain and a B gain are calculated in correspondence to the estimated value and a white balance adjustment is performed on the photographic image signal using these gains.

14 Claims, 11 Drawing Sheets

ELECTRONIC CAMERA WITH WHITE BALANCE ADJUSTMENT RECORDING MEDIUM STORING IMAGE PROCESSING PROGRAM FOR WHITE BALANCE ADJUSTMENT

INCORPORATION BY REFERENCE

The disclosure of the following priority application is herein incorporated by reference: Japanese Patent Application No. 11-11509.

BACKGROUND OF THE INVENTION

1. Field of the Invention

The present invention relates to an electronic camera having a white balance adjustment function. The present invention also relates to a recording medium that stores an image processing program for white balance adjustment.

2. Related Art

Methods known in the art which are employed to implement white balance adjustment in electronic cameras include the external sensor method and the TTL image-capturing element method. In the external sensor method, a diffused light receiving window such as an diffusion plate and a color sensor are provided in the electronic camera in addition to the image-capturing element of the camera to achieve white balance adjustment by estimating the color of the light source based upon the results of the output from the color sensor. In the TTL image-capturing element method, white is extracted by integrating the image signals corresponding to the entire image plane or image signals corresponding to a portion of the image plane for all the colors based upon the subject image signals received by the image-capturing element via taking lens. Both methods are achieved through application of the principle that when the colors of a normal subject are integrated, an achromatic color (gray) results.

The external sensor method has the following problem yet to be addressed.

(1) The area around the subject and the area around the camera may not be irradiated by the same light and in such a case, an error may occur.

The TTL image-capturing element method has the following problems yet to be addressed.

(1) Since it is necessary to engage the image-capturing element in an operation at all times through exposure, a great quantity of power is consumed when an image-capturing element with a large number of pixels is employed.

(2) When the TTL image-capturing element method is adopted in a single lens reflex camera having good viewfinder visibility, additional members such as a half mirror are required.

(3) In order to extract white from the subject colors, white must be extracted from colors in the entire image plane or in an area constituting a portion of the image plane. When the number of pixels is large, e.g., over 2 million pixels, the circuit is bound to become large and complex to perform integration of the image signals at high speed. In particular, when a method through which the image-capturing element is divided into blocks each constituted of a specific number of pixels to perform various types of image processing is adopted, the circuit scale is bound to become large to perform the integration operation within each block at high speed.

(4) Accurate white balance adjustment cannot be achieved if a portion illuminated by different light such as a person near a window is present within the image plane.

SUMMARY OF THE INVENTION

An object of the present invention is to provide an electronic camera capable of estimating the light source color through a simple circuit structure and having a white balance adjustment function which enables high speed processing and low power consumption.

Another object of the present invention is to provide a recording medium that stores an image processing program for white balance adjustment that enables light source color estimation to be achieved at high speed and with low power consumption.

The electronic camera having a white balance adjustment function according to the present invention comprises a photographic image-capturing element that receives a subject light flux and outputs a photographic image signal, a white balance adjustment image-capturing element that receives the subject light flux and outputs a white balance adjustment image signal, an offset quantity calculation unit that extracts color data based upon the image signal for, at least, a portion of a photographic image plane of the white balance adjustment image-capturing element and determines a quantity by which the color data are offset from light source reference color data, a light source color estimation unit that estimates the light source color by evaluating the offset quantity calculated by the offset quantity calculation unit, and an adjustment unit that adjusts the white balance of the image signal output by the photographic image-capturing element based upon the estimated value obtained by the light source color estimation unit.

The white balance adjustment image-capturing element may output image signals that each correspond to areas achieved by dividing the photographic image plane into a plurality of areas. In this case, the offset quantity calculation unit ascertains the quantity by which the image signal corresponding to each divided area is offset from the light source reference color data and the light source color estimation unit estimates the light source color by evaluating the offset quantities calculated for the plurality of areas in conformance to a specific criterion.

If the electronic camera is further provided with a focal point detection unit having a plurality of focal point detection areas, the offset quantity calculation unit calculates the offset quantity in a divided area that corresponds to a focal point detection area used in focal point detection performed by the focal point detection unit.

The light source reference color data may be either a full radiator locus or a standard correlated color temperature locus. The offset quantity may be represented by the distance from the full radiator locus on a uniform color space, the distance from the standard correlated color temperature locus or a value achieved by multiplying either distance with a constant. The specific criterion adopted by the light source color estimation unit is a criterion for determining whether or not the offset quantity is within a specific range from the full radiator locus or the standard correlated temperature locus.

The light source color estimation unit estimates that the light source is of a specific color if the offset quantity does not satisfy the specific criterion. If the offset quantity is within a predetermined white data range, it decides that the specific criterion is satisfied.

Another electronic camera having a white balance adjustment function according to the present invention comprises a photographic image-capturing element that receives a subject light flux and outputs a photographic image signal, a white balance adjustment image-capturing element that receives the subject light flux and outputs a white balance adjustment image signal, an offset quantity calculation unit that extracts color data based upon image signals each corresponding to one of a plurality of areas achieved by dividing the photographic image plane of the white balance adjustment image-capturing element into a plurality of areas and ascertains quantities by which the color data are offset from light source reference color data, a light source color estimation unit that estimates the light source color based upon color data corresponding to the average value of the offset quantities within a predetermined reference range among the plurality of offset quantities calculated by the offset quantity calculation unit or color data corresponding to the smallest offset quantity among the plurality of offset quantities calculated by the offset quantity calculation unit, and an adjustment unit that adjusts the white balance of the image signal output by the photographic image-capturing element based upon the estimated value obtained by the light source color estimation unit.

If this electronic camera, too, is further provided with a focal point detection unit with a plurality of focal point detection areas, it is desirable to calculate an offset quantity in at least one divided area corresponding to a focal point detection area used for focal point detection performed by the focal point detection unit.

In addition, in this electronic camera, too, the light source reference color data may be either the full radiator locus or the standard correlated color temperature locus, and the offset quantity may be represented by the distance from the full radiator locus on a uniform color space, the distance from the standard correlated color temperature locus or a value achieved by multiplying either distance by a constant, with the reference range being set within a specific range from the full radiator locus or the standard correlated color temperature locus. If it is decided that none of the plurality of offset quantities is within the reference range, the color of the light source is estimated to be a predetermined specific color. The reference range is set as a predetermined white data range.

In either type of electronic camera, the number of pixels in the white balance adjustment image-capturing element is smaller than the number of pixels in the photographic image-capturing element.

In a recording medium that stores an image processing program for white balance adjustment according to the resent invention, a step in which color data are extracted from, at least, a partial area of a photographic image plane based upon a white balance adjustment image signal and a quantity by which the color data are offset from light source reference color data is ascertained, a light source color estimation step in which the offset quantity calculated in the offset quantity calculation step is evaluated to estimate the light source color and an adjustment step in which white balance of a photographic image signal is adjusted based upon the estimated value obtained in the light source color estimation step are recorded.

DETAILED DESCRIPTION OF THE PREFERRED EMBODIMENTS

First Embodiment

Figure 1:
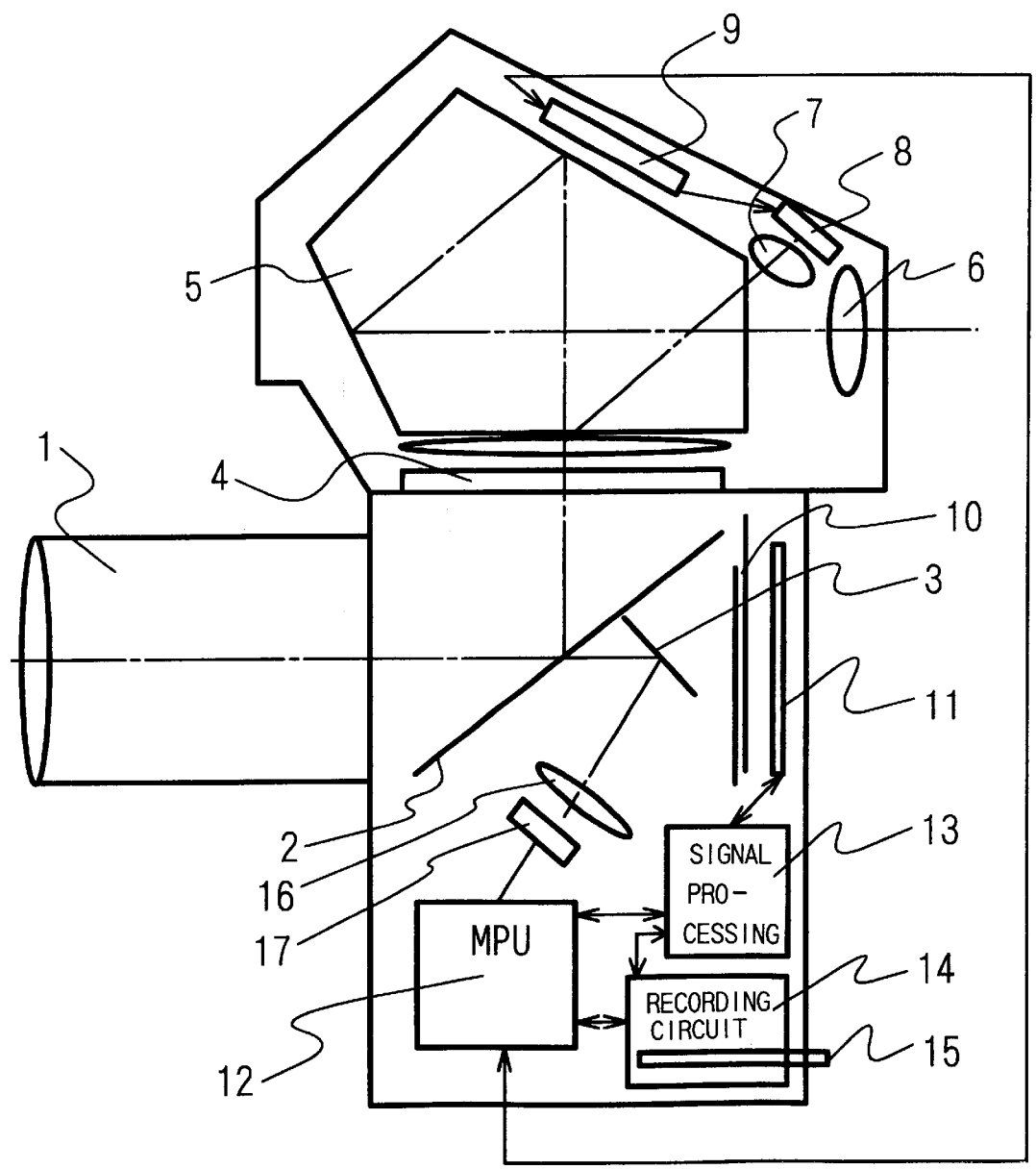
FIG. 1 is an external view showing the overall structure of the electronic camera in a first embodiment.

FIGS. 1–8 illustrate the first embodiment of the present invention. Especially, FIG. 1 illustrates the entire structure of the first embodiment of the electronic camera according to the present invention. In the electronic camera shown in FIG. 1, a subject light flux S having traveled through a taking lens 1 is guided to a focal point detection optical system 16, an AF sensor 17, a finder screen 4 and a pentaprism 5 via a reflex mirror 2 and an AF sub-mirror 3. Then, the subject light flux enters a color extraction image capturing element 8 constituted of a two-dimensional CCD element via an optical system 7 and, at the same time, enters the photographer's eye via an eyepiece lens 6. In addition, the electronic camera is provided with a color extraction photometering circuit 9 connected to the color extraction image-capturing element 8, a focal plane shutter 10, a photographic image-capturing element 11 constituted of a two-dimensional CCD element provided immediately rearward of the shutter 10, a camera control circuit 12 constituted of a microcomputer (a main MPU) that engages in control of the entire electronic camera, a signal processing circuit 13 that processes signals for driving the photographic image-capturing element 11 and conducting compressing and/or interpolating of image signals and the like and a recording circuit 14 that records an image in a memory card (an image recording medium such as a CF card) 15.

The AF sensor 17 receives the subject light flux entering from the taking lens 1 via the focal point detection optical system 16 with the reflex mirror 2 in a lowered state as illustrated in FIG. 1, detects a focus state, so that focusing (autofocus) operation is performed by driving the taking lens 1. The focal point detection calculation may be performed through phase difference focal point detection processing achieved by, for instance, a pupil-splitting method known in the art. The color extraction image-capturing element 8, which is constituted of a color image-capturing element as illustrated in FIG. 3, to be referred to later, extracts colors and brightness levels in various areas of the image plane by condensing the diffused light at the finder screen 4. The color extraction photometering circuit 9 generates a white balance control signal and an exposure control signal based upon an image signal output by the color extraction image-capturing element 8 and outputs them to the camera control unit 12.

When the shutter is released in the electronic camera, the camera control unit 12 determines the lens aperture value and the shutter speed based upon the exposure control signal to capture an image of the subject by the image-capturing element 11, and also adjusts the white balance in the image signal from the image-capturing element 11 based upon the white balance control signal. In more specific terms, in response to an instruction issued by the camera control unit 12, the signal processing circuit 13 drives the image-capturing element 11 based upon the exposure control signal to receive the subject light flux over a specific length of time and reads out the image signal. The signal processing circuit 13 performs white balance adjustment on the image signal read out from the image-capturing element 11 based upon the white balance control signal. In addition, the signal processing circuit 13 converts the image signal having undergone the white balance adjustment to a specific image signal format and outputs the image signal in the specific image signal format to the recording circuit 14. The recording circuit 14 receives the signal from the signal processing circuit 13 and records it in the memory card 15.

Figure 2:
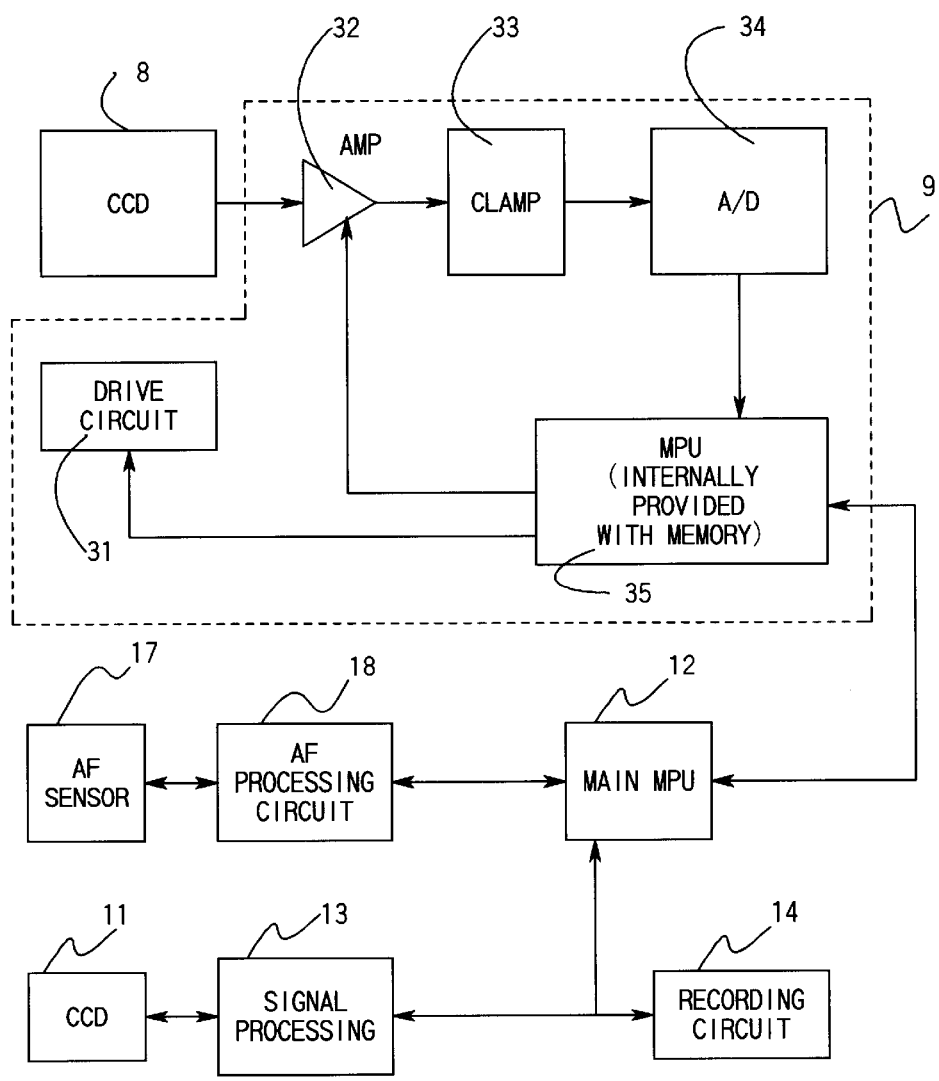
FIG. 2 is a block diagram of the circuit that processes image signals in the electronic camera shown in FIG. 1.

FIG. 2 is a block diagram of the color extraction photometering circuit 9 among the circuits engaged in processing the image signal in the electronic camera shown in FIG. 1. The color extraction photometering circuit 9 in the electronic camera comprises a CCD drive circuit 31 that implements drive control of the color extraction image-capturing element 8, a gain setting circuit (AMP)32 that amplifies a photoelectric signal from the color extraction image-capturing element 8, a clamp circuit 33, an A/D converter 34 and a microcomputer (hereafter referred to as an MPU) 35 engaged in control of the various circuit elements. The color extraction image-capturing element 8 is driven with a read cycle corresponding to a specific exposure period and outputs an image signal in response to a command from the CCD drive circuit 31. The gain setting circuit 32 amplifies the image signal from the color extraction image-capturing element 8 at an amplification factor selected from a plurality of amplification factors. The DC component of the amplified image signal is clamped by the clamp circuit 33. The clamped image signal is then digitized by the A/D converter 34 and is taken into the memory within the MPU 35.

The MPU 35 determines the read cycle so as to control the exposure period and determines the amplification factor so that a specific level is achieved for the output signal from the color extraction image-capturing element 8. In addition, the MPU 35 generates an exposure control signal by determining a photographic exposure through an integral averaging performed on signals corresponding to R, G and B colors in image signals taken in at the specific level with Respect to each specific areas achieved through division. Then it obtains calorimetric data in correspondence to the RGB ratio or a standardized color signal for each divided area based upon the image signal corresponding to the divided area and generates a white balance control signal which will ensure that the integrated value of the image signal corresponding to a specific area indicates white. The white balance control signal is constituted of an R gain G/R and a B gain G/B.

Figure 3A:
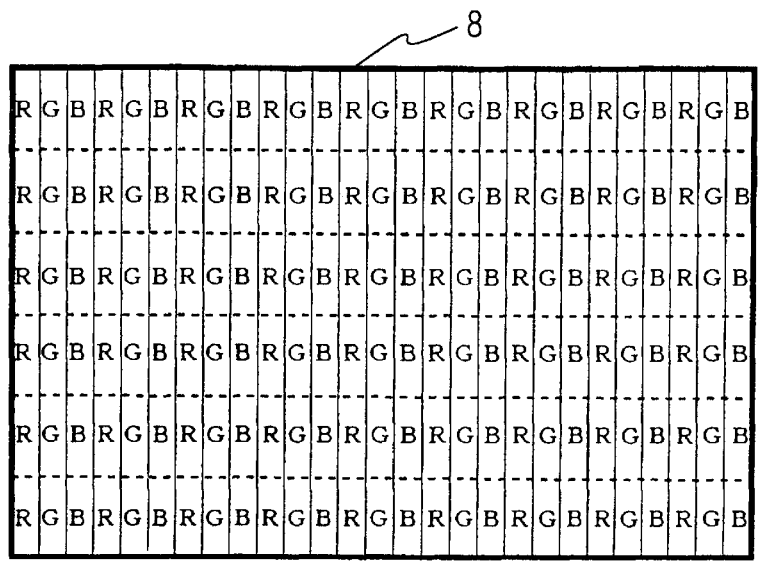
FIG. 3A illustrates the arrangement of color filters for a color extraction image-capturing element employed in the electronic camera shown FIG. 1.

FIG. 3A presents an example of a color filter arrangement which may be adopted at the color extraction image-capturing element 8 in the electronic camera shown in FIG. 1, and FIGS. 3B–3D illustrate area divisions. As shown in FIG. 3A, the image-capturing element 8 is an interline CCD image-capturing element having stripe filters in R, G and B colors arranged along the longitudinal direction. In the image-capturing element 8, the longitudinal/lateral aspect ratio of each pixel is 3:1. In other words, 3 pixels provided along the longitudinal direction are equivalent to a single RGB pixel in the image-capturing element. With the number of pixels at, for instance, 14 (lateral)×63 (longitudinal), RGB signals corresponding to 14 pixels (lateral)×21 pixels (longitudinal) are obtained at an image plane aspect ratio of 2:3. It is to be noted that while the number of pixels at the color extraction image-capturing element 8 shown in FIG. 3A is 6 (lateral)×27 (longitudinal) to facilitate the explanation, the number of pixels at the color extraction image-capturing element 8 may be 1,000 to several thousand when the photographic image-capturing element 11 has 1–3 million pixels.

Figure 3B:
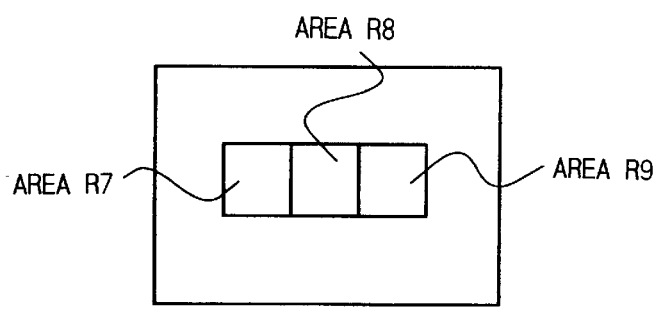
FIGS. 3B–3D illustrate color extraction areas in the color extraction image-capturing element shown in FIG. 3A.
Figure 3C:
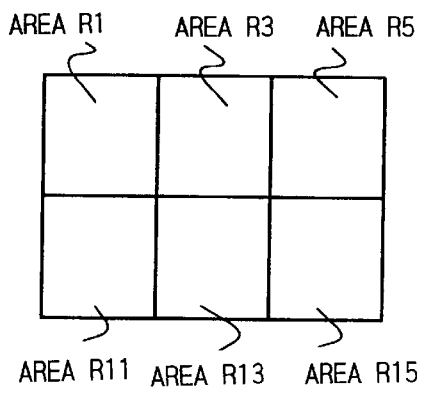
Figure 3D:
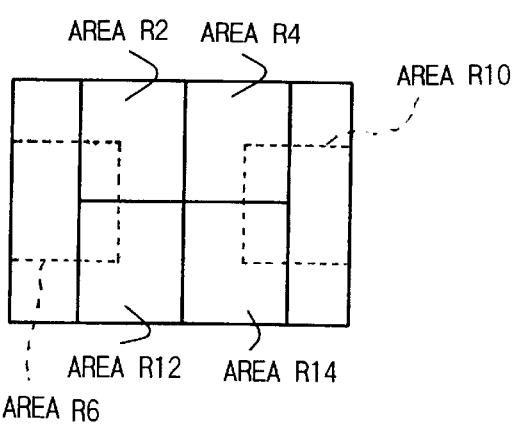
Figure 4:
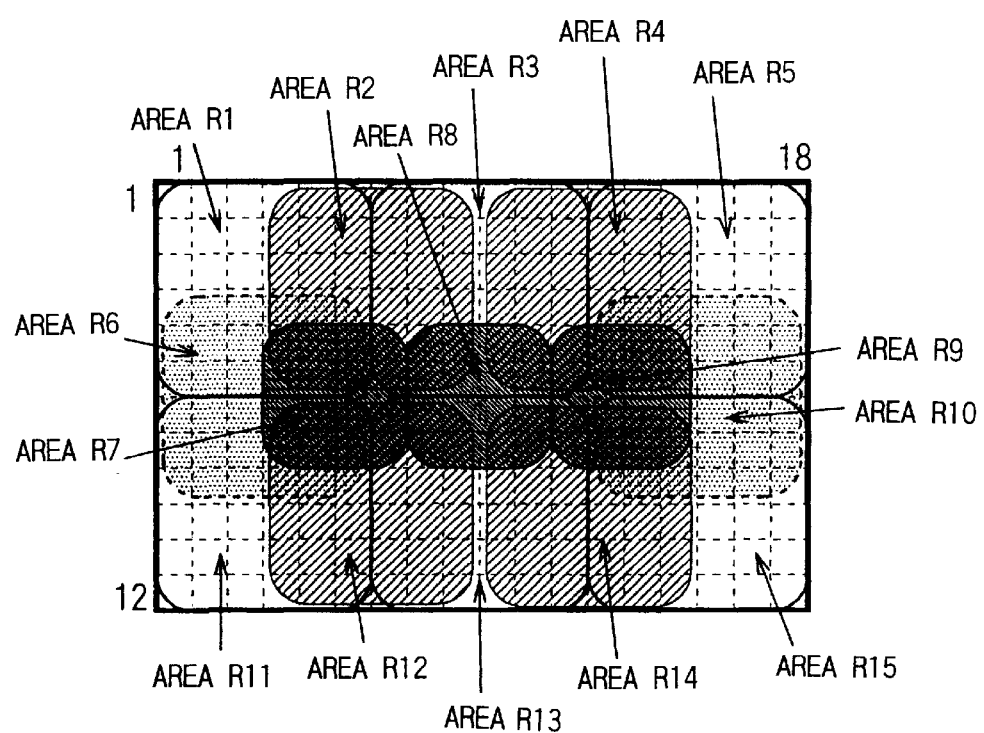
FIG. 4 illustrates an arrangement achieved by superimposing the color extraction areas shown in FIGS. 3B–3D.

FIGS. 3B–3D illustrate area arrangement achieved by multi-dividing the image-capturing element 8. In the example, the image plane at the image-capturing element 8 shown in FIG. 3A is divided into 15 areas, i.e., divided areas (color extraction areas) R1–R15. As illustrated in FIG. 4, these divided areas R1–R15 are arranged so that they partially overlap each other. FIG. 4, which shows the individual areas shown in FIGS. 3B–3D superimposed upon each other, presents an example of divided areas for a color extraction integration operation. The image plane is divided into 15 areas by varying the number of pixels in the divided areas to be averaged and overlapping the divided areas.

Figure 5:
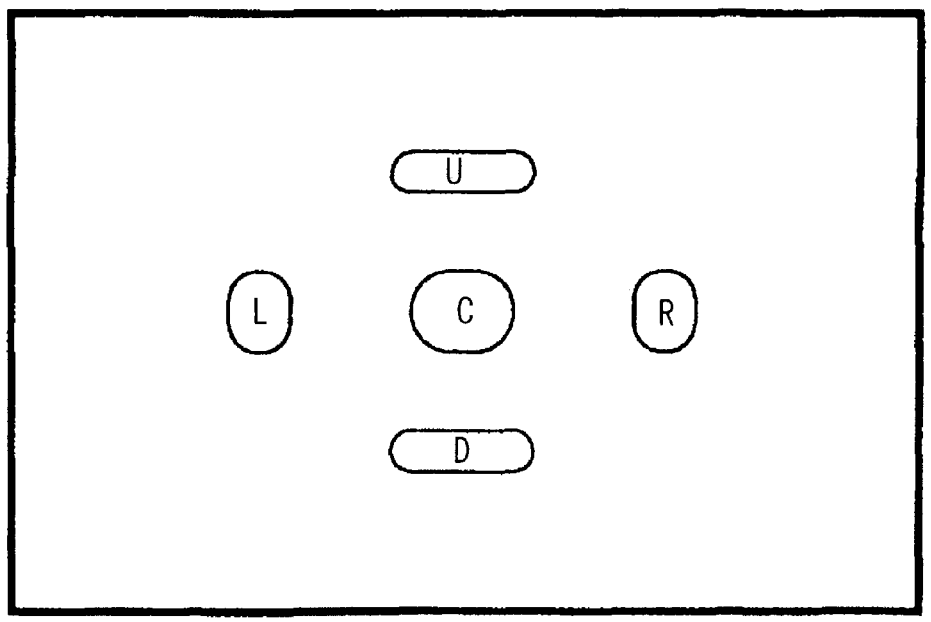
FIG. 5 illustrates the arrangement of AF areas in the electronic camera shown in FIG. 1.

In FIG. 5, which presents an example of focal point detection areas in the photographic image plane at the AF sensor 17, focal point detection areas are provided at 5 positions, i.e., center (C), left (L), right (R), up (U) and down (D). A focal point detection area may be set through user specification or through a command issued by the MPU 12. When setting a focal point detection area in response to a command by the MPU 12, an optimal focal point detection area may be determined through automatic control implemented based upon the type of subject to perform focusing. The focal point detection areas for focal adjustment and the divided areas for color extraction integration correspond to each other. For instance, the color extraction areas R7, R8, R9, R3 and R13 shown in FIG. 4 respectively correspond to the focal point detection areas (L), (C), (R), (U) and (D) shown in FIG. 5.

Figure 6:
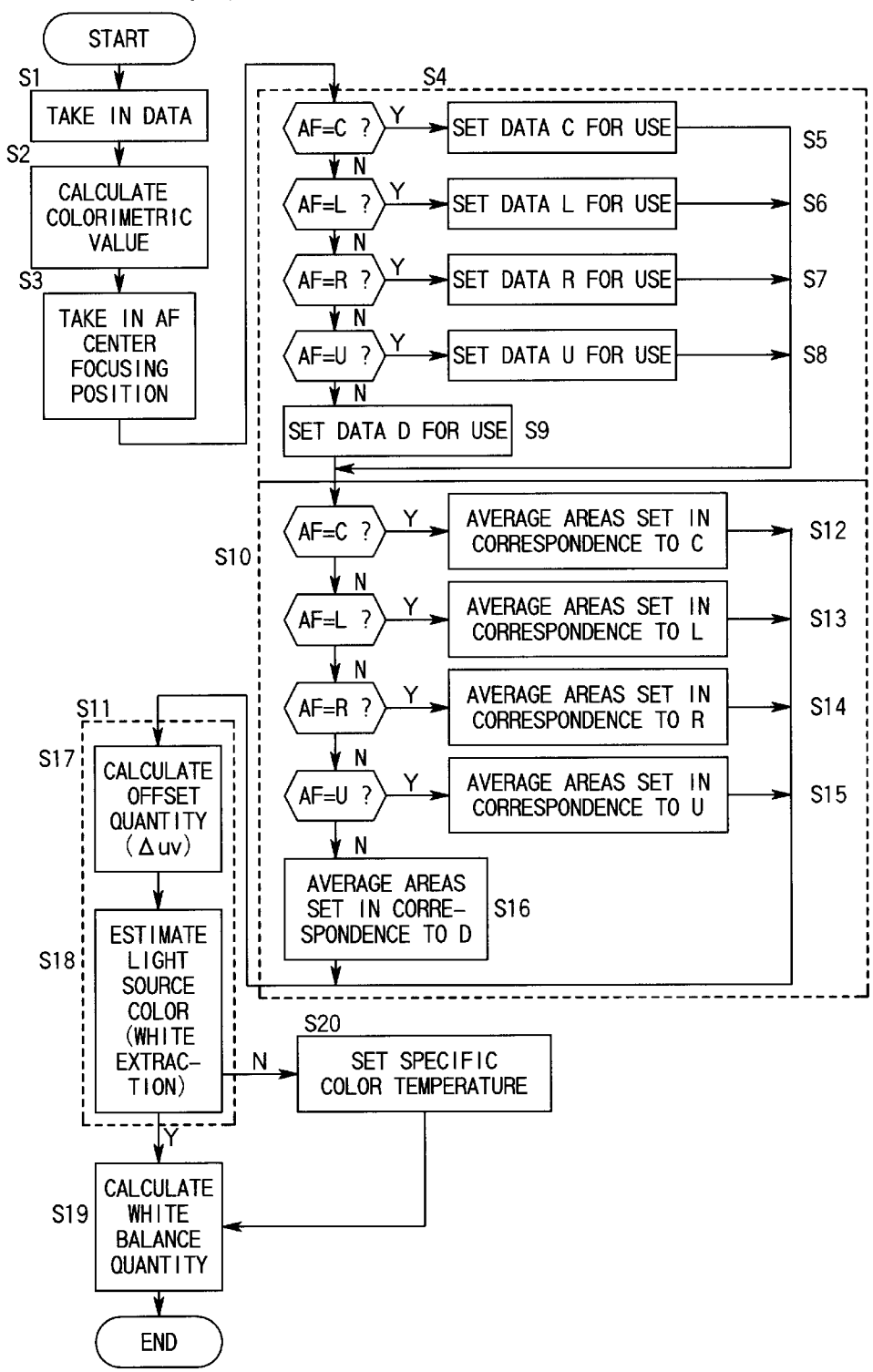
FIG. 6 is a flowchart of the color extraction algorithm adopted in the electronic camera shown in FIG. 1 in the first embodiment.

FIG. 6 is a flowchart of the color extraction algorithm executed by the MPU 35. In step S1, image data from the color extraction image-capturing element 8 are taken in. In step S2, colorimetric values corresponding to the 15 color extraction areas at the image-capturing element 8 are obtained through calculation. The calorimetric values may be calculated by using, for instance, the uv calorimetric system. They may be calculated by using another calorimetric system. In step S3, the positional signal indicating the focal point detection area used for focusing at the AF sensor 17 is taken in from the MPU 12.

Step S4 is a selection step implemented to select color extraction areas to be used for white balance control signal generation. In step S4, the processing in steps S5–S9 is performed. In steps S5–S9, the focal point detection area that has been set is identified and corresponding data to be used are set. Namely, all of the 15 color extraction areas R1–R15 shown in FIG. 4 are selected if the focal point detection area is set at the center (C) in step S5. If the focal point detection area is set at the left position (L) in step S6, color extraction areas excluding the color extraction areas R5, R10 and R15 are selected.

If the focal point detection area is set at the right position (R) in step S7, color extraction areas excluding the color extraction areas R1, R6 and R11 are selected. If the focal point detection area is set at the up position (U) in step S8, color extraction areas excluding the color extraction areas R11 and R15 are selected. Color extraction areas excluding the color extraction areas R1 and R5 are selected if the focal point detection area is set at the down position (D) in step S9.

In step S10, the average image plane calorimetric value is ascertained with respect to each selected area. In order to ascertain the image plane average, the following steps S12–S16 are executed for the areas excluding those that overlap. In steps S12–S16, the focal point detection area that has been set is identified and an arithmetic operation is executed to obtain the average value of the corresponding calorimetric values. Namely, if the focal point detection area is set at the center (C), in step S12 the calorimetric values are calculated for the color extraction areas R1, R3, R5, R11, R13 and R15.

If the focal point detection area is set at the left position (L), in step S13 the calorimetric values are calculated for the color extraction areas R1, R3, R11, and R13. If the focal point detection area is set at the right position (R), in step S14 the calorimetric values are calculated for the color extraction areas R3, R5, R13 and R15. If the focal point detection area is set at the up position (U), in step S15 the colorimetric values are calculated for the color extraction areas R1, R3, R5, R12, and R14. If the focal point detection area is set at the down position (D), in step S16 the colorimetric values are calculated for the color extraction areas R2, R4, R11, R13 and R15.

In step S11 (white extraction step), the following steps S17 and S18 are executed to ascertain a calorimetric value closest to the light source color based upon the average colcorimetric values obtained in step S10 and the color extraction areas corresponding to the AF detection area selected in step S4.

The white extraction is achieved as follows. Namely, offset quantity Δuv between each average colorimetric value and the light source color is calculated in step S17, and if it is decided in step S18 that the offset quantity Δuv is within a specific uv range ΔE, the associated average calorimetric value is estimated to be white. For instance, offset quantities Δuv each indicating the degree by which the calorimetric value (uv value) calculated in correspondence to one of the plurality of color extraction areas is offset from the full radiator locus on a calorimetric plane such as a uniform color space uv are calculated. Each of the offset quantities Δuv represents the distance between the calorimetric value on the calorimetric plane and the full radiator locus, i.e., the distance obtained by drawing a vertical line extending from the calorimetric value to the full radiator locus. Alternatively, a value achieved by multiplying the distance by an integer (constant) may be used. Full radiator refers to a temperature radiator that absorbs the entire incident light regardless of the wavelength, the direction of incidence or the polarization of the light. It is to be noted that the offset quantity Δuv may be the quantity by which the colorimetric value (uv value) in a given color extraction area is offset from the correlated color temperature locus of standard light D. The correlated color temperature locus of standard light D is determined based upon the USC chromaticity diagram of CIE.

After the offset quantities Δuv are calculated in step S17, the operation proceeds to step S18. In step S18, the average of calorimetric values with their offset quantities within the specific uv range ΔE is set as the calorimetric value (color temperature Tc, offset quantity Δuv) of the light source color. Alternatively, the calorimetric value with the smallest offset quantity Δuv is set as the calorimetric value (color temperature Tc, offset quantity Δuv) of the light source color. The specific uv range ΔE represents a range of calorimetric values that may be regarded as white, and a calorimetric value (uv value) in this range indicates white at the corresponding color temperature. For instance, ΔE is approximately 13/1,000 (in uv value conversion) in FIG. 7, which is to be referred to later.

If none of the offset quantities Δuv are within the specific uv range ΔE, the operation proceeds to step S20 to set a specific color temperature (Tc), e.g., 5,000 Kelvin (K), as the estimated light source color. In step S19, G/R (R gain) and G/B (B gain) at the image-capturing element to be used in the white balance control signal are ascertained by referencing the table, not shown, based upon the color temperature (Tc), and the white balance control signal thus achieved is output to the camera control unit (main MPU) 12. The MPU 12 implements white balance processing using these gains.

Figure 7:
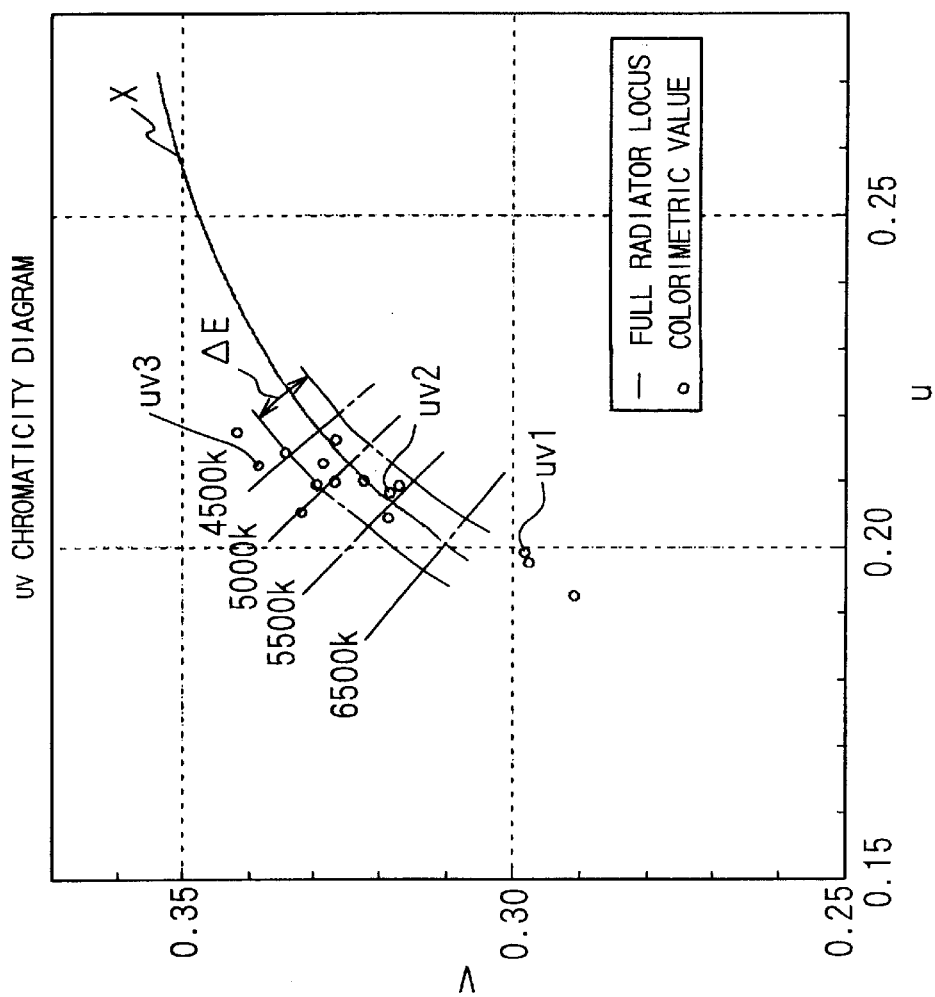
FIG. 7 is an equivalent correlated color temperature chart.
Figure 8:
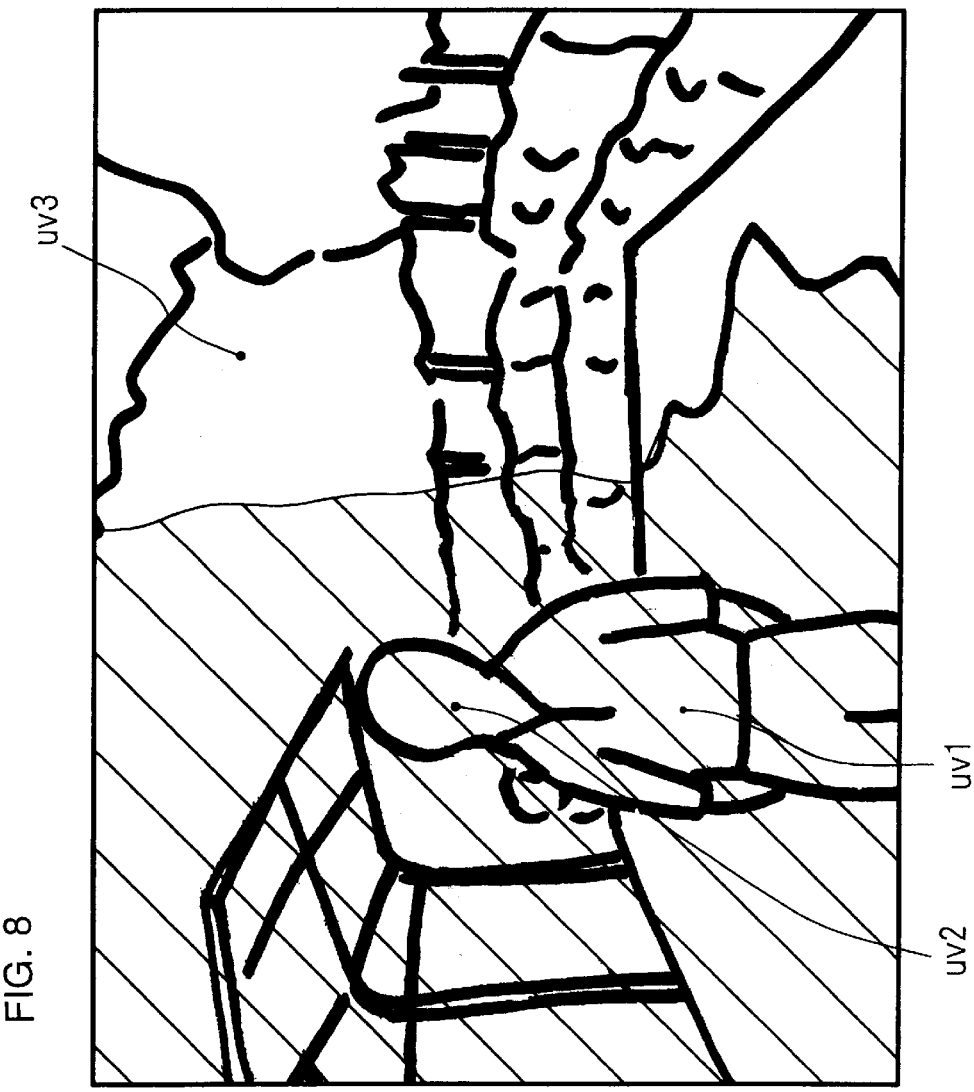
FIG. 8 presents an actual photographic image to facilitate the explanation of the color extraction algorithm adopted in the first embodiment.

Step S11 is now explained in further detail in reference to FIGS. 7 and 8. In the equivalent correlated color temperature chart shown in FIG. 7, the solid line X represents the full radiator locus and the 1-point chain lines define the area ΔE (the range of values that may be regarded as white) corresponding to the specific uv range extending on either side of the full radiator locus. FIG. 8 shows a picture (scene) taken through actual photographing. In the shaded area on the left side of the image, shade is created by trees with a person dressed in blue positioned in the shade and trees are illuminated by direct light in the far background on the right side of the image. In FIG. 7, circle marks indicate uv values obtained as a result of colorimetry performed on the photographic image shown in FIG. 8. In FIG. 7, the point at which a normal line passing through a calorimetric value (uv value) of the light source and orthogonally crossing the full radiator locus X indicated by the solid line intersects the full radiator locus X represents the color temperature of the light source.

The signal processing, which adopts the color extraction algorithm explained earlier in reference to FIG. 6, may be performed on an image signal obtained by capturing an image of the scene shown in FIG. 8 as follows.

In FIG. 6, a focal detection area is set in step S4. Since the person is present on the left side in FIG. 8, the focal point detection area AF is set to L in step S6. In conformance to the focal point detection area setting, color extraction areas are set in step S13. In step S17, a plurality of calorimetric values (uv values) corresponding to the plurality of color extraction areas selected in step S13 are calculated and a plurality of offset quantities Δuv representing the degrees by which the individual calorimetric values (uv values) are offset from the full radiator locus are calculated. Representative calorimetric values uv1–uv3 and the individual calorimetric values in the vicinity of the representative calorimetric values in the chromaticity diagram in FIG. 7 indicate such plurality of calorimetric values.

FIG. 7 indicates the following. The calorimetric values in the vicinity of the representative colorimetric value uv1 reflect the effect of the blue color of the clothing the person is wearing. The calorimetric values in the vicinity of the representative calorimetric value uv2 reflect the effect of the shade created by the trees. The calorimetric values in the vicinity of the representative calorimetric value uv3 reflect the effect of the green of the trees in the background.

In this case, the light source color is estimated in step S18 based upon offset quantities Δuv within the specific uv range ΔE among the offset quantities Δuv of the color extraction areas set in correspondence to the selected focal point detection area. In other words, since the calorimetric values in the vicinity of the representative calorimetric values uv1 and uv3 are excluded, a correct white balance control signal can be obtained. By actually performing a calorimetric operation with a white board set in place of the person in FIG. 8, values within the range of 5,000~5,500 Kelvin in FIG. 7 were achieved. This fact indicates that white is faithfully extracted through the algorithm explained above.

Second Embodiment

Figure 9:
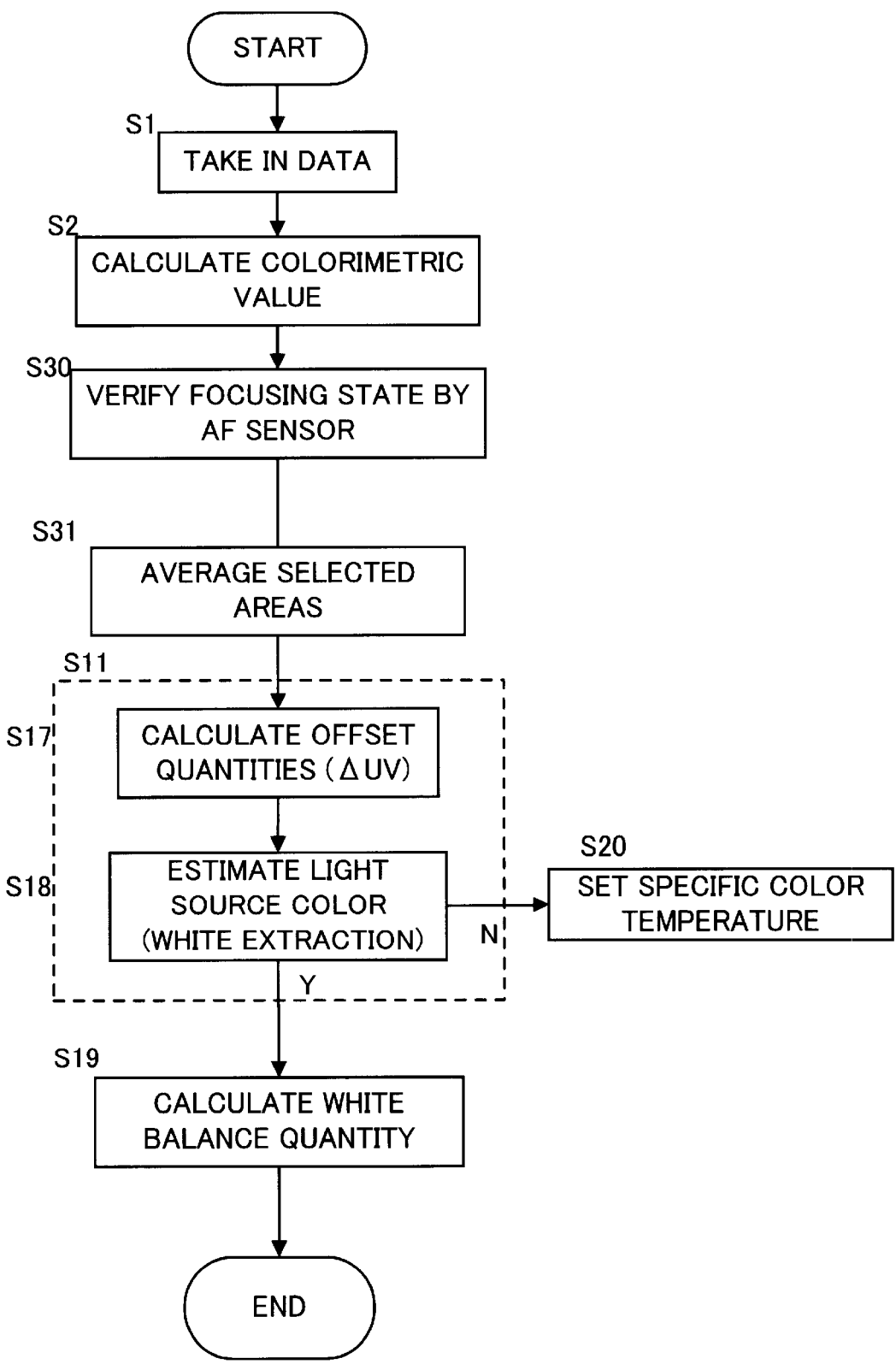
FIG. 9 is a flowchart of the color extraction algorithm adopted in the electronic camera shown in FIG. 1 in a second embodiment.
Figure 10:
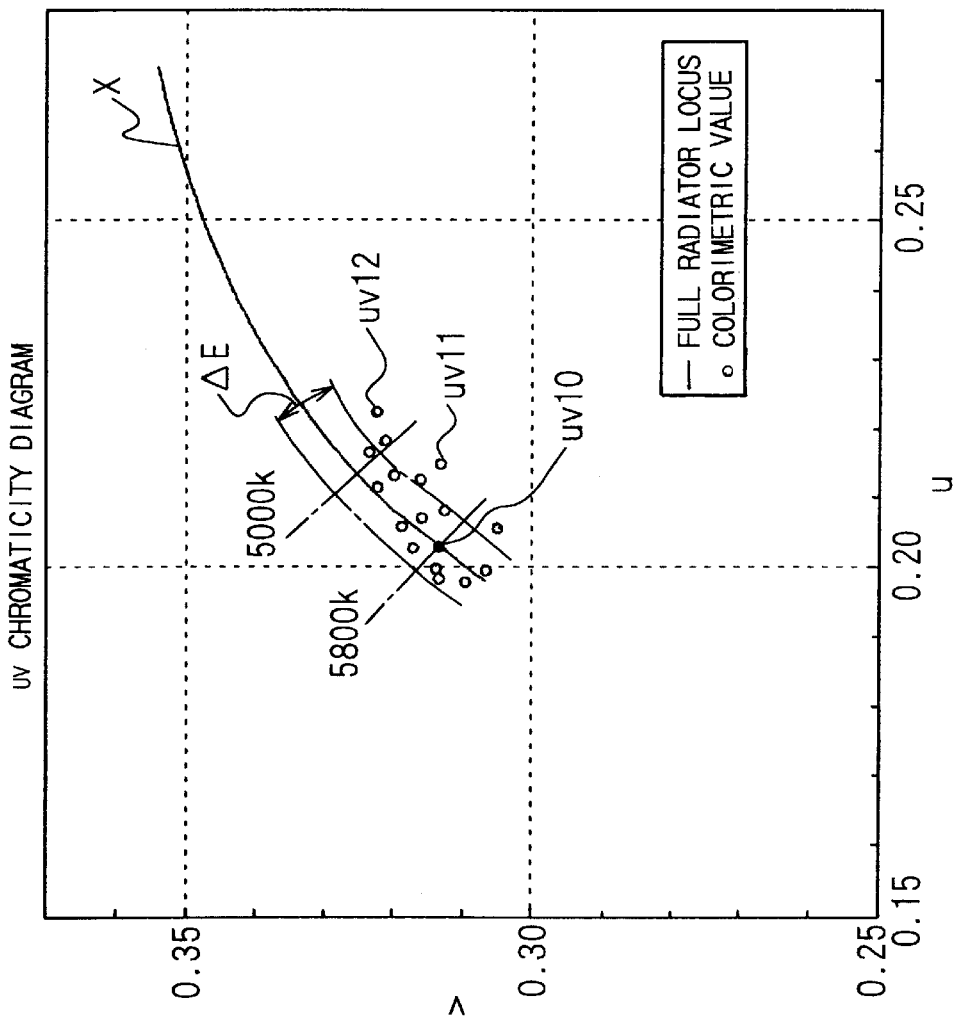
FIG. 10 is an equivalent correlated color temperature chart.
Figure 11:
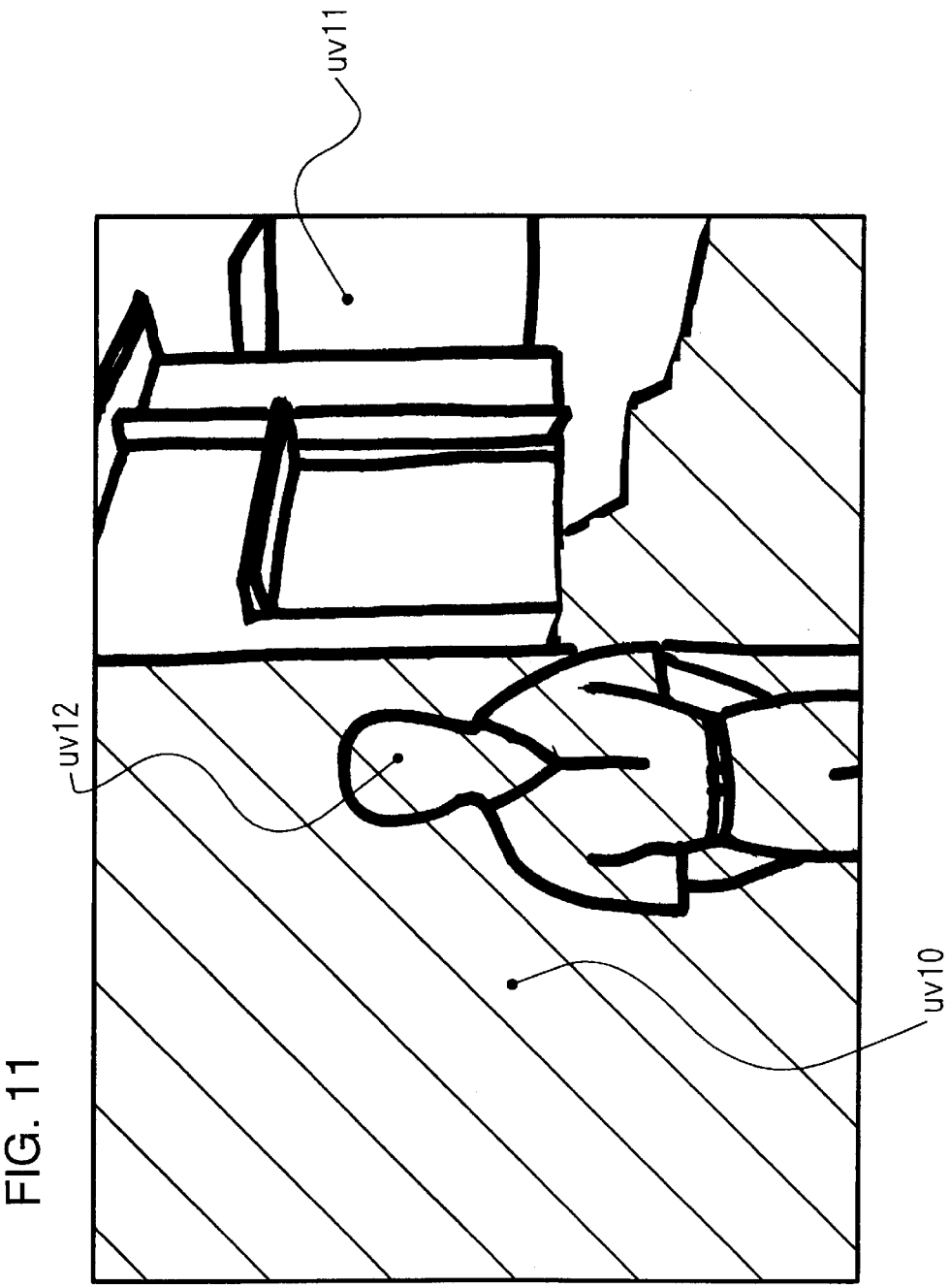
FIG. 11 presents an actual photographic image to facilitate the explanation of the color extraction algorithm adopted in the second embodiment.

FIGS. 9–11 illustrate the second embodiment of the present invention. The second embodiment differs from the first embodiment in that while the focal point detection device in the first embodiment adopts a multiple focal point detection method, the second embodiment implements focal point detection only at one point at the center of the photographic image plane. In addition, the color extraction algorithm is modified in correspondence to the change in the focal point detection method. Since other aspects are identical, the following explanation is given by mainly focusing on the differences.

FIG. 9 is a flowchart of the color extraction algorithm used by the MPU 35, with the difference from the flowchart shown in FIG. 6 being that steps S4 and S10 are omitted. In addition, in the flowchart shown in FIG. 9, step S30 is executed instead of step S3 shown in FIG. 6. In step S30, the focusing state is detected by the AF sensor 17 viewing the center of the image plane and if a focussed state is detected, the operation proceeds to step S31.

In step S31, all the divided areas, i.e., the 15 color extraction areas, are set for white extraction and calorimetric values are calculated for each of 15 areas. Then, the average calorimetric value is calculated for each area. In step S11 (white extraction step), the calorimetric value which is the closest to the light source color is ascertained based upon the average calorimetric values obtained in step S31 and the 15 color extraction areas set in step S31. In other words, the following steps S17 and S18 are executed in step 11.

In step S17, 15 offset quantities Δuv each representing a quantity by which a calorimetric value (uv value) is offset from the full radiator locus are calculated as explained above. In step S18, the average of calorimetric values having offset quantities within the specific uv range ΔE among the 15 offset quantities Δuv is set as the colorimetric value (color temperature Tc, offset quantity Δuv) of the light source color. Alternatively, the calorimetric value with the smallest offset quantity Δuv is set as the calorimetric value (color temperature Tc, offset quantity Δuv) of the light source color. The average mentioned above is indicated as uv10 in FIG. 10.

The specific uv range ΔE represents a range of calorimetric values that may be regarded as white, and a colorimetric value (uv value) in this range indicates white at the corresponding color temperature. For instance, ΔE is approximately 13/1,000 (in uv value conversion) in FIG. 10. In addition, if none of the offset quantities Δuv are within the specific uv range ΔE, the operation proceeds to step S20 to set a specific color temperature (Tc), e.g., 5,000 Kelvin (K), as the light source color.

In FIG. 10, the point at which a normal line passing through a calorimetric value (uv value) of the light source and orthogonally crossing the full radiator locus X indicated by the solid line intersects the full radiator locus X represents the color temperature of the light source. FIG. 11 shows a picture (scene) taken through actual photographing. In the shaded area on the left side of the image, shade is created by a building with a person dressed in blue positioned in the shade area and a building is illuminated by direct light in the far background on the right side of the image with almost all the area of the image set in the shade.

The signal processing, which adopts the color extraction algorithm explained earlier in reference to FIG. 9 may be performed on an image signal obtained by capturing an image of the scene shown in FIG. 11 as follows. In step S17, a plurality of average calorimetric values (uv values) corresponding to the plurality of color extraction areas selected in step S31 are calculated and a plurality of offset quantities Δuv representing the degrees by which the individual calorimetric values (uv values) are offset from the full radiator locus are calculated. Representative calorimetric values uv10–uv12 and the individual calorimetric values in the vicinity of the representative calorimetric values in the chromaticity diagram shown in FIG. 10 indicate such plurality of calorimetric values.

FIG. 10 indicates the following. The calorimetric values in the vicinity of the representative calorimetric value uv10 reflect the effect of the shade. The calorimetric values in the vicinity of the representative calorimetric value uv11 reflect the effect of the direct light in the background. The calorimetric values in the vicinity of the representative calorimetric value uv12 reflect the effect of the face of the person.

Since processing such as averaging is performed on offset quantities Δuv within the specific uv range ΔE among the offset quantities Δuv corresponding to the 15 color extraction areas, in step S18 the calorimetric values in the vicinity of the representative calorimetric values uv11 and uv12 are excluded. As a result, a correct white balance control signal is obtained. By actually performing a calorimetric operation with a white board set in place of the person in FIG. 10, values close to uv10 representing the average value, i.e., values around 58,000 Kelvin in FIG. 10 were achieved. This fact indicates that white is faithfully extracted through the algorithm explained above.

By using the offset quantities relative to the full radiator locus of the light source, each representing the quantity of offset with respect to a calorimetric value obtained by integrating R, G and B image signals output by each pixel at an image-capturing element for photometry and colorimetry having a small number of pixels which is provided separately from the photographic image-capturing element to perform white extraction as a white extraction benchmark in this manner, white balance data can be obtained at high speed with low power consumption during a photographing operation while requiring reduced circuitry. In addition, by varying the areas used for white extraction in correspondence to the focusing area used in an AF operation, the light source color around the main subject can be detected to improve the degree of accuracy of the white balance control. Instead of the full radiator locus, the color temperature change locus of the CIE standard light may be used.

The following advantages are achieved in the embodiments explained above.

(1) Since color data are extracted from at least partial area in the photographic image plane of the white balance adjustment image-capturing element having pixels the number of which is much smaller than the number of pixels at the photographic image-capturing element and the quantity of offset of the color data from the light source full radiator locus (reference color data) is ascertained to accurately estimate the light source color, white balance data for photographing can be obtained at high speed while consuming only a small quantity of power in a small scale circuit.

(2) By dividing the photographic image plane of the white balance adjustment image-capturing element into a plurality of areas and using image signals corresponding to the individual divided areas, a plurality of offset quantities can be evaluated in conformance to a specific criterion to estimate the color of the light source. Thus, a highly accurate estimation is achieved.

(3) In the case where a focal point detection device having a plurality of focal point detection areas is utilized, offset quantities for white balance adjustment are calculated based upon image signals corresponding to divided areas which constitute the area used for focal point detection by the focal point detection device to enable correct white balance adjustment to be achieved for the area where the main subject is positioned with a high degree of certainty, thereby realizing high image quality photographing results.

(4) Since a decision is made as to whether or not an offset quantity representing the value that indicates the distance from the light source full radiator locus (color temperature locus) on a uniform color space or a value achieved by multiplying the distance by an integer is within a specific range relative to the full radiator locus (color temperature locus), offset quantity data outside the specific range that will adversely affect the estimation can be excluded, thereby enabling highly accurate estimation of the light source color temperature.

(5) If the offset quantities used in the light source color estimation do not conform to the specific criterion, the light source is estimated to be of a specific color to achieve an averaged white balance.

It is to be noted that while an explanations are given above on examples in which the present invention is adopted in a single lens reflex electronic camera, the present is invention may be adopted in any of various other types of electronic cameras. In addition, it may be adopted in an electronic camera mounted at an information apparatus such as a computer.

Furthermore, image processing such as that achieved in the present invention may be executed by a computer on raw image signals obtained through image capturing performed by an electronic camera and stored in an external storage medium such as a hard disk. Raw image data include image-capturing signals for color extraction. In this case, a storage medium in which a program for executing the processing in the flowchart shown in FIG. 6 is stored is set at the computer to load the program into the computer. Alternatively, the program may be loaded into the computer from a remote location by utilizing an external public line. The image processing described above may be executed by adopting various other circuits through different control flows as well as the circuits and the control flows explained in reference to the embodiments. Alternatively, all the image processing may be achieved through hardware.

What is claimed is:

1. An electronic camera having a white balance adjustment function, comprising:
a photographic image-capturing element that receives a subject light flux and outputs a photographic image signal;
a white balance adjustment image-capturing element that receives the subject light flux and outputs a white balance adjustment image signal;
an offset quantity calculation unit that extracts color data based upon the image signal for, at least, partial area in a photographic image plane of said white balance adjustment image-capturing element and ascertains an offset quantity by which the color data are offset from light source reference color data;
a light source color estimation unit that estimates a light source color by evaluating the offset quantity calculated by said offset quantity calculation unit; and
an adjustment unit that adjusts the white balance of the image signal output by said photographic image-capturing element based upon an estimated value output by said light source color estimation unit.

2. An electronic camera according to claim 1, wherein:
said white balance adjustment image-capturing element output image signals for a plurality of areas achieved by dividing the photographic image plane into a plurality of areas;
said offset quantity calculation unit calculates an offset quantities that indicates a quantities by which color data corresponding to the image signal in each of the divided areas are offset from said light source reference color data;
and said light source color estimation unit estimates the light source color by evaluating the offset quantities calculated in correspondence to the plurality of areas in conformance to a specific criterion.

3. An electronic camera according to claim 2, further comprising:
a focal point detection unit having a plurality of focal point detection areas, wherein:
said offset quantity calculation unit calculates the offset quantity for each divided area that corresponds to a focal point detection area used in focal point detection by said focal point detection unit.

4. An electronic camera according to claim 1, wherein:
said light source reference color data are either a full radiator locus or a standard correlated color temperature locus;
the offset quantity is a value representing a distance from the full radiator locus on a uniform color space, a value representing a distance from the standard correlated color temperature locus or a value achieved by multiplying either distance by a constant; and
a specific criterion used at said light source color estimation unit is used to determine whether or not the offset quantity is within a specific range relative to the full radiator locus or the standard correlated color temperature locus.

5. An electronic camera according to claim 4, wherein:
said light source color estimation unit estimates that the light source is a specific color if the offset quantity does not conform to the specific criterion.

6. An electronic camera according to claim 4, wherein:
the specific range is a predetermined white data range.

7. An electronic camera according to claim 1, wherein:
said white balance adjustment image-capturing element has fewer pixels than said photographic image-capturing element.

8. An electronic camera having a white balance adjustment function, comprising:
a photographic image-capturing element that receives a subject light flux and outputs a photographic image signal;
a white balance adjustment image-capturing element that receives the subject light flux and outputs a white balance adjustment image signal;

an offset quantity calculation unit that extracts color data based upon image signals each corresponding to one of a plurality of areas achieved by dividing a photographic image plane of said white balance adjustment image-capturing element and calculates offset quantities indicating quantities by which the color data are offset from light source reference color data;

a light source color estimation unit that estimates a light source color based upon color data corresponding to an average value of offset quantities within a predetermined reference range among the plurality of offset quantities calculated by said offset quantity calculation unit or color data corresponding to a smallest offset quantity among the plurality of offset quantities calculated by said offset quantity calculation unit; and an adjustment unit that adjusts the white balance of the image signal output by said photographic image-capturing element based upon an estimated value output by said light source color estimation unit.

9. An electronic camera according to claim 8, further comprising:

a focal point detection unit having a plurality of focal point detection areas, wherein:

said offset quantity calculation unit calculates an offset quantity for at least one of the divided areas that corresponds to a focal point detection area used in focal point detection by said focal point detection unit.

10. An electronic camera according to claim 8, wherein:

said light source reference color data are either a full radiator locus or a standard correlated color temperature locus;

each offset quantity is a value representing a distance from the full radiator locus on a uniform color space, a value representing a distance from the standard correlated color temperature locus or a value achieved by multiplying either distance by a constant; and the reference range is set within a specific range relative to the full radiator locus or the standard correlated color temperature locus.

11. An electronic camera according to claim 10, wherein:

said light source color estimation unit estimates that the light source is a specific color if it is decided that none of the plurality of offset quantities is within the reference range.

12. An electronic camera according to claim 10, wherein:

the specific range is a predetermined white data range.

13. An electronic camera according to claim 8, wherein:

said white balance adjustment image-capturing element has fewer pixels than said photographic image-capturing element.

14. A recording medium that stores an image processing program for white balance adjustment, having recorded therein;

a step in which color data are extracted from, at least, a partial area of a photographic image plane based upon a white balance adjustment image signal and an offset quantity by which the color data are offset from light source reference color data is calculated;

a light source color estimation step in which the light source color is estimated by evaluating the offset quantity calculated in said offset quantity calculation step; and an adjustment step in which white balance of a photographic image signal is adjusted based upon an estimated value obtained in said light source color estimation stem.

* * * * *